(12) United States Patent
Tamulewicz (10) Patent No.: US 10,834,915 B1
(45) Date of Patent: Nov. 17, 2020

(54) AVIAN NESTING DETERRENT

(71) Applicant: Paul Tamulewicz, Glendale, AZ (US)

(72) Inventor: Paul Tamulewicz, Glendale, AZ (US)

( * ) Notice: Subject to any disclaimer, the term of this patent is extended or adjusted under 35 U.S.C. 154(b) by 0 days.

(21) Appl. No.: 16/561,437

(22) Filed: Sep. 5, 2019

(51) Int. Cl.
*A01M 29/32* (2011.01)

(52) U.S. Cl.
CPC .................. *A01M 29/32* (2013.01)

(58) Field of Classification Search
CPC ...... A01M 29/32; E04D 13/004; E04D 13/08; E04B 1/72; E04F 19/02
USPC .................................................. 52/101, 287.1
See application file for complete search history.

(56) References Cited

U.S. PATENT DOCUMENTS

| | | | | |
|---|---|---|---|---|
| 2,193,994 A * | 3/1940 | Weaver | ............... | E04B 1/34315 52/264 |
| 4,052,830 A * | 10/1977 | Smith | ............... | E04F 19/04 52/288.1 |
| 4,233,786 A * | 11/1980 | Hildreth | ............... | E04D 13/1585 52/556 |
| 4,359,844 A * | 11/1982 | Hoggard | ............... | A01M 29/26 52/101 |
| 4,965,976 A * | 10/1990 | Riddle | ............... | E04B 1/6803 52/396.05 |
| 5,097,641 A * | 3/1992 | Hand | ............... | A01K 5/0142 52/101 |
| 5,181,338 A * | 1/1993 | Chatten | ............... | A01M 29/06 43/1 |
| 5,303,523 A * | 4/1994 | Hand | ............... | A01G 13/105 119/61.53 |
| 5,487,199 A * | 1/1996 | Nelson | ............... | E01D 19/00 14/74.5 |
| 5,584,147 A * | 12/1996 | Agee | ............... | E04D 13/0645 138/32 |
| 5,913,780 A * | 6/1999 | Goergen | ............... | A01M 29/32 156/295 |
| 6,006,698 A * | 12/1999 | Negre | ............... | A01M 29/26 119/537 |
| 6,115,982 A * | 9/2000 | Lindenberg | ............... | A47B 77/022 52/272 |
| 6,125,602 A * | 10/2000 | Freiborg | ............... | E04D 1/265 52/198 |
| 6,182,400 B1 * | 2/2001 | Freiborg | ............... | E04D 1/30 52/276 |
| 6,360,504 B1 * | 3/2002 | Webb | ............... | E04D 3/405 52/300 |
| 6,546,676 B2 * | 4/2003 | Wiesener | ............... | A01M 29/32 119/52.3 |
| 6,591,575 B2 * | 7/2003 | Benedettini | ............... | E04F 19/061 52/211 |
| 6,625,925 B1 * | 9/2003 | Foster | ............... | A01G 9/28 47/33 |
| 6,941,706 B2 * | 9/2005 | Austin | ............... | E04D 13/004 52/302.3 |
| D545,423 S * | 6/2007 | Delallo | ............... | D23/386 |
| 7,581,359 B2 | 9/2009 | Bukeavich | | |
| 7,712,263 B1 * | 5/2010 | Lippie | ............... | E04B 1/72 52/101 |

(Continued)

*Primary Examiner* — James M Ference
(74) *Attorney, Agent, or Firm* — Hudak, Shunk & Farine Co. LPA (57) ABSTRACT

A device for deterring birds from nesting on a downspout of a home, building or other structure. The device includes a top edge configured to discourage birds from nesting and preferably perching thereon and a bottom edge adapted to be positioned on a downspout.

12 Claims, 7 Drawing Sheets

(56) References Cited

U.S. PATENT DOCUMENTS

| | | | | |
|---|---|---|---|---|
| 8,607,827 B2* | 12/2013 | Bell | ............... | E04D 13/08 |
| | | | | 138/109 |
| 8,627,613 B2* | 1/2014 | Parker | ............... | A01M 29/32 |
| | | | | 52/101 |
| 8,640,397 B2* | 2/2014 | Donoho | ............... | A01M 29/32 |
| | | | | 52/101 |
| 8,925,256 B2 | 1/2015 | Donoho | | |
| 9,394,683 B1* | 7/2016 | Hammons | ............... | A01M 29/32 |
| 9,631,368 B1* | 4/2017 | Heo | ............... | E04D 13/004 |
| 10,036,166 B1* | 7/2018 | Heo | ............... | E04D 13/004 |
| D872,900 S * | 1/2020 | Heo | ............... | D25/139 |
| 2002/0073633 A1* | 6/2002 | Schlichting | ............... | A01M 29/32 |
| | | | | 52/101 |
| 2004/0194423 A1* | 10/2004 | Payne | ............... | E04D 13/004 |
| | | | | 52/741.1 |
| 2006/0000166 A1* | 1/2006 | Rossetti | ............... | E04F 19/022 |
| | | | | 52/287.1 |
| 2006/0207195 A1* | 9/2006 | Donoho | ............... | E04B 1/72 |
| | | | | 52/101 |
| 2008/0110106 A1* | 5/2008 | Holly | ............... | A01M 29/32 |
| | | | | 52/101 |
| 2009/0019792 A1* | 1/2009 | Bukeavich | ............... | E04D 13/004 |
| | | | | 52/101 |
| 2013/0055657 A1* | 3/2013 | Parker | ............... | A01M 29/32 |
| | | | | 52/101 |
| 2013/0174496 A1* | 7/2013 | Lanza | ............... | E04D 13/14 |
| | | | | 52/58 |
| 2018/0251983 A1* | 9/2018 | Heo | ............... | E04D 13/004 |

\* cited by examiner

AVIAN NESTING DETERRENT

FIELD OF THE INVENTION

The present invention relates to a device for deterring birds from nesting on a downspout of a home, building or other structure. The device includes a top edge configured to discourage birds from nesting and preferably perching thereon and a bottom edge adapted to be positioned on a downspout.

BACKGROUND OF THE INVENTION

Downspouts on structures such as homes and buildings have long been a preferred location for nesting birds. Oftentimes, downspouts exit a gutter outlet and are constructed to angle downwards and mount against the structure. Prefabricated downspout components that are widely available and used in the building industry include standard formed corner fittings made to fit end to end with straight downspout conduit consisting of a generally rectangular shape and cross section. The junction formed by a downspout abutting against a structure provides the ideal foundation for a firm anchor point with avian nesting materials. Property owners are continuously challenged to protect the beauty and integrity of structures from nests of all types. Droppings from nesting areas contaminate and ruin building materials, and time is continuously invested in the sanitation of living environments to protect from known diseases in bird droppings and maintaining aesthetic beauty. As most birds and bird nests with eggs are protected by law, property owners are also challenged to take pro-active, human approaches in protecting their structure as well.

Various approaches have been proposed in the art for deterring avian nesting and perching, see for example:

U.S. Publication 2004/0194423 relates to a method for controlling or discouraging the roosting and nesting of birds such as pigeons on structures. Roosting zones and nesting zones on the structure are identified and covered by a slide with a slick outer surface attached to produce a sloped face. The slide may be a polyhedron that caps a horizontal surface or a sheet that follows a natural slope in the structure.

U.S. Pat. No. 7,581,359 relates to a decorative bird perching deterrent for spaces between building eaves and downspouts that is a substantially right-triangle structure of a preselected material with at least 50 percent of the area bounded by the sides of the right triangle structure filled with the preselected material in a decorative fashion. Various ways of attaching to the downspout or the building are provided near at least one edge of the right-triangle structure.

U.S. Pat. No. 9,394,683 relates to a device that is mounted to the downspout of a home or building to obstruct birds and other pests from nesting and building in and around downspouts to eliminate the mess and potential damage these nests can cause, preserving the exterior of the home, and reportedly eliminating the need for additional maintenance and costly repairs due to debris, blockage and water damage.

Additional approaches are found in U.S. Pat. Nos. 4,359, 844; 5,181,338; 5,303,523; 5,487,199; 6,941,706; 8,607, 827; 8,627,613; and 8,925,256.

SUMMARY OF THE INVENTION

In view of the above, the art still needs a nesting deterrent for birds that is easy to install, aesthetically pleasing, durable, and effective against nesting and preferably perching.

According to the present invention, the problems noted above and others are solved by a bird nest deterrent that prevents birds from nesting on downspouts that comprises two sloped planar sides that fit atop the downspout components where they meet the structure. The term "planar" when used herein with respect to the sides encompasses not only completely flat surfaces, but also surfaces that are curved such as concave or convex surfaces. The two planar sides meet at an uppermost top edge and form an angular cross section. Both sides are profiled at their bottom edge to abut with a gutter outlet made from standard industry components. A single common back edge for both sides is profiled to abut with the structure the downspout is mounted to. In one embodiment, the bottom edges of each plane are secured to the segment of downspout spanning from the gutter outlet to the structure with a fastener, such as pull ties, effectively eliminating the junction where the downspout meets the structure.

According to the preferred embodiment, the apex at which the first and second side meet to form an angular cross section features a point or curve such as a radius that deters birds from nesting and perching. The bottom edge of both sides is formed with each of a) a straight portion disposed at an angle with respect to horizontal and b) a curved portion such as a radius that mate with the top side of a standard gutter outlet downspout assembly where it meets the structure. The single common back edge of both sides is formed with an angle to match that created by the standard downspout fitting assembly mounted to the structure.

Further features, aspects, and advantages of the present invention will become more apparent from the following detailed description of the preferred embodiment and review of the accompanying figures.

DETAILED DESCRIPTION OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "first end", "second end", "front", "back", "horizontal", "vertical", "up", "upper", "down", "lower", "top" and "bottom" as well as derivatives thereof (e.g., "horizontally", "downwardly", "upwardly", etc.) should be construed to refer to the orientation as then described or as shown in the drawing figure under discussion. These relative terms are for convenience of description and are not intended to require a particular orientation unless specifically stated as such. Terms including "inwardly" versus "outwardly", "longitudinal" versus "lateral" and the like are to be interpreted relative to one another or relative to an axis of elongation, or an axis or center of rotation, as appropriate. Terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

FIG. 1 through FIG. 5 illustrate one embodiment of an avian nesting deterrent 10. In a preferred embodiment, the nesting deterrent 10 is formed, preferably molded, from a clear plastic such as polycarbonate, although any other clear, semi-clear or opaque plastic may also be used including but not limited to acrylic, polystyrene, polypropylene, polyethylene, polyvinyl chloride or polyester and any combination thereof. The bird nest deterrent 10 may also be fabricated in part or in whole from a metal, such as aluminum, as well.

The nesting deterrent 10 comprises of a first angled planar side 12 and an opposing angled planar side 14 that join together at an apex 16. Each of planar side 12 and planar side 14, individually, may be formed having one or more of straight segments, curved segments, bent segments, that can be arranged in any order. That said, the nesting deterrent has a wider base formed by planes 12 and 14 as compared to a top of the device where the planes 12 and 14 are joined at apex 16. the embodiment of FIGS. 1 to 5, the apex 16 is shown having a radius 18, although it is to be understood an apex 16 can also be formed with one or more of or alternatively with a sharp corner or bevel. In some embodiments, the angle Y and angle Z as described herein and shown in the drawings work together to form a complex angle as expressed herein. A range of radii from a center line of the device that would maintain this would be anywhere from the sharp corner (or 0.00") through just under the width of the rectangular downspout component. There are two standard sizes of rectangular downspout, 2"×3" (as illustrated in the drawings) and 3"×4". Ranges for the radius would be 0-1.5" (0-38 mm) and 0-2" (0-51 mm) respectively in a preferred embodiment.

Figure 1:
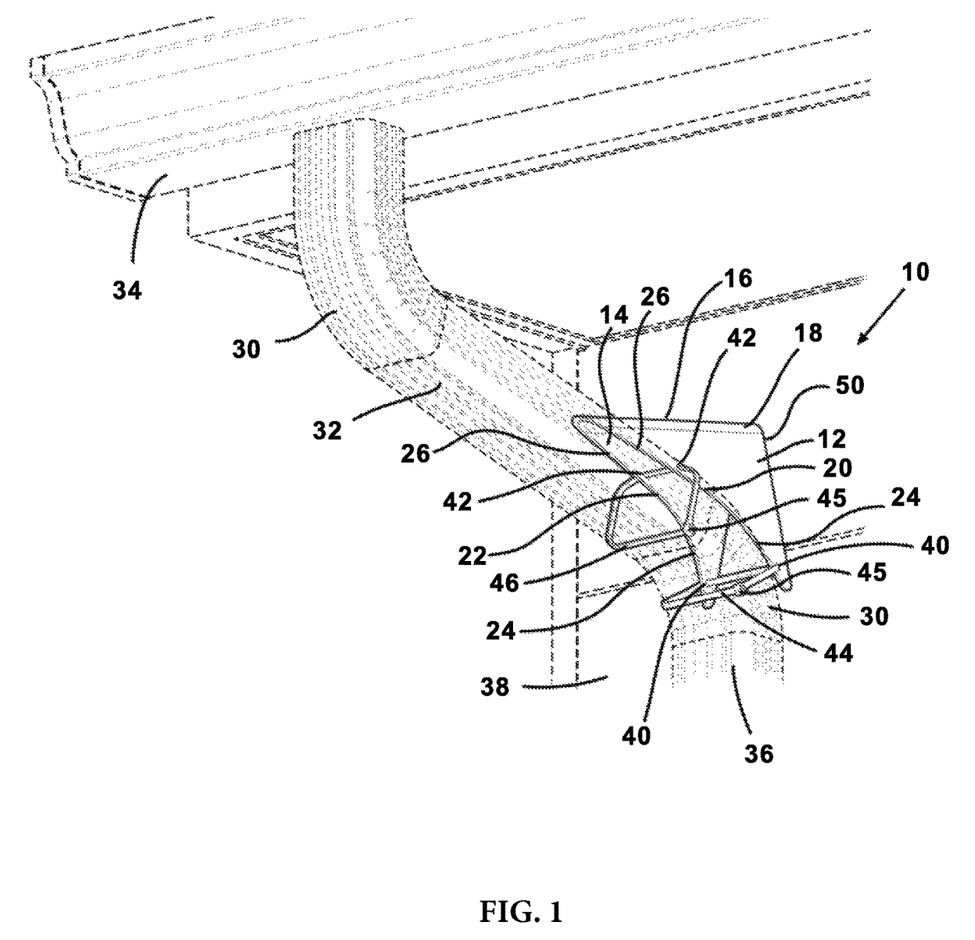
FIG. 1 is a bottom perspective view of one embodiment of a bird nest deterrent according to the present invention mounted on a segment of downspout extending from a gutter outlet to a structure.
Figure 2:
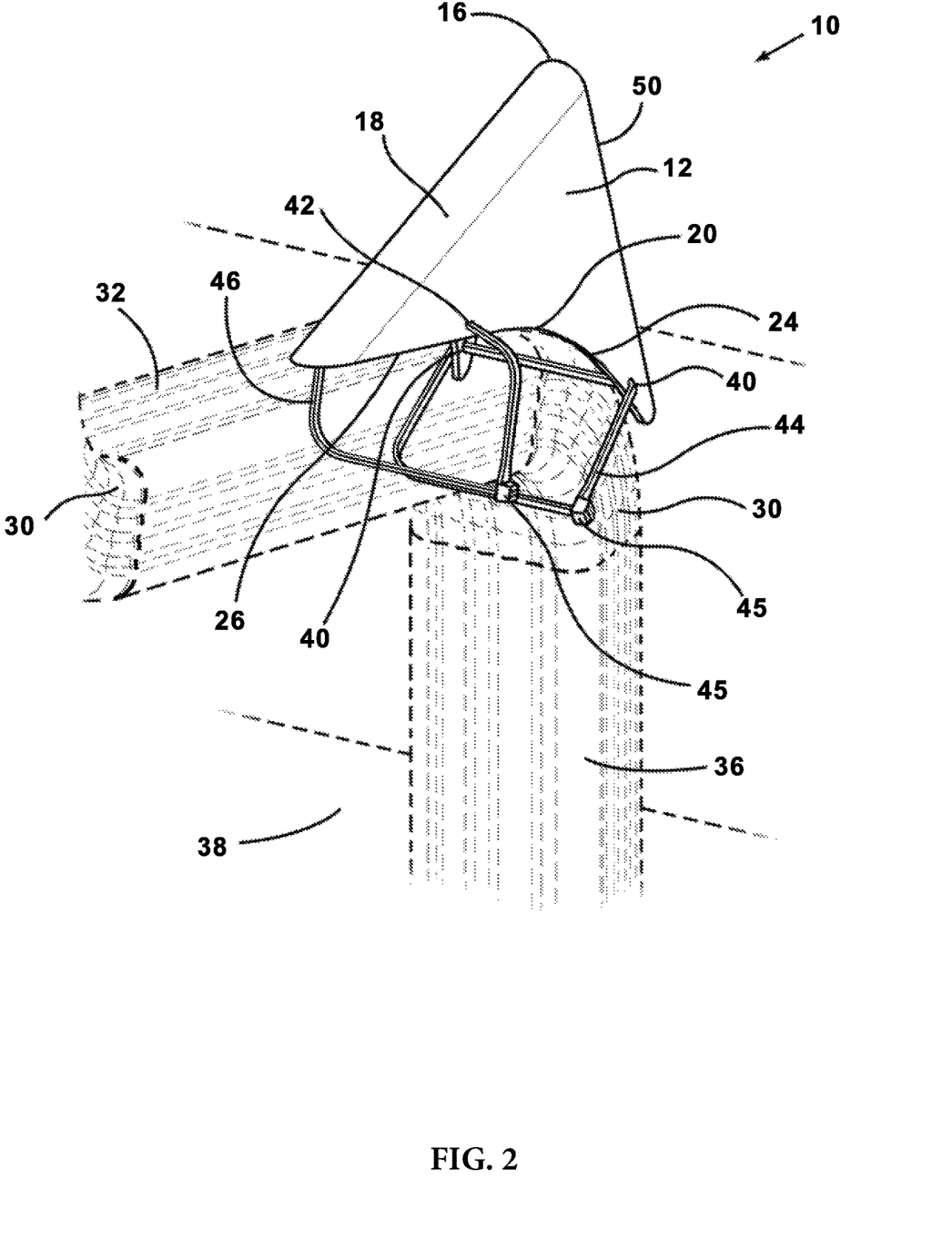
FIG. 2 is a top perspective view of the bird nest deterrent mounted on the segment of downspout extending from the gutter outlet to the structure shown in FIG. 1.
Figure 3:
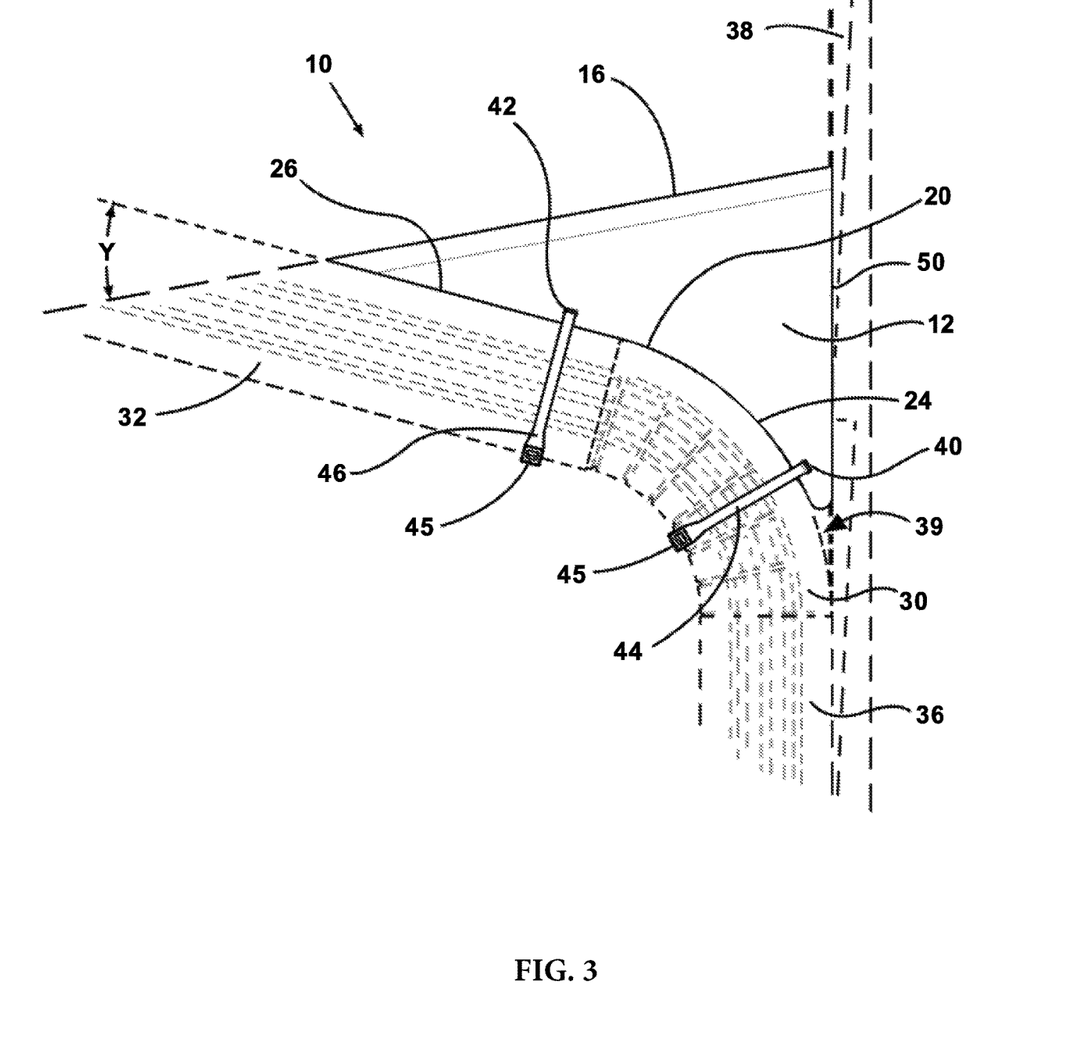
FIG. 3 is a side view of the bird nest deterrent mounted on the downspout segment extending from the gutter outlet to the structure shown in FIG. 1.
Figure 5:
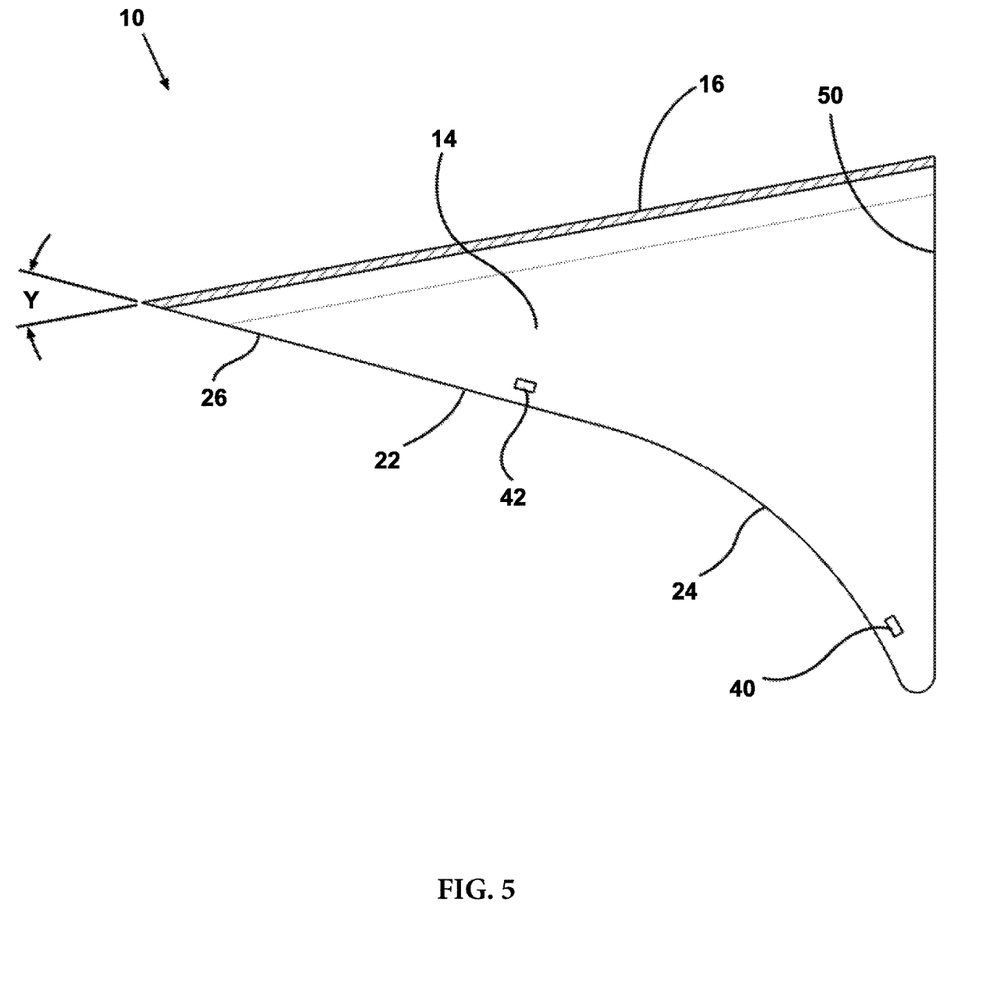
FIG. 5 is a side cross sectional view of the bird nest deterrent at line X-X in FIG. 4.

In an important aspect of the present invention, the base of deterrent 10 includes first bottom edge 20 and second bottom edge 22 which are adapted to contact a portion of the downspout with each bottom edge 20, 22 including a straight portion disposed at an angle with respect to horizontal and a curved portion that are adapted to mate with the contour of the downspout. In one embodiment, a first bottom edge 20 of the first angled planar side 12 and a second bottom edge 22 of the second angled planar side 14 are identically contoured with a curved portion 24, preferably a radius that transitions to a straight portion 26. The curved portion 24 and straight portion 26 of the first bottom edge 20 and the second bottom edge 22 are profiled at an angle Y as shown in FIG. 3 and FIG. 5, ranging from 10-60 degrees.

The curved portion 24 and straight portion 26 of the first bottom edge 20 and the second bottom edge 22 are designed to fit over a standard downspout corner fitting 30 when it is connected to a standard downspout straight section 32, leading upwards in most cases to an additional standard corner fitting 30 and up into the gutter 34. A vertically oriented standard straight downspout section 36 in most cases connects to the lowermost standard downspout corner fitting 30 and is mounted against the structure 38, creating a junction 39.

Figure 4:
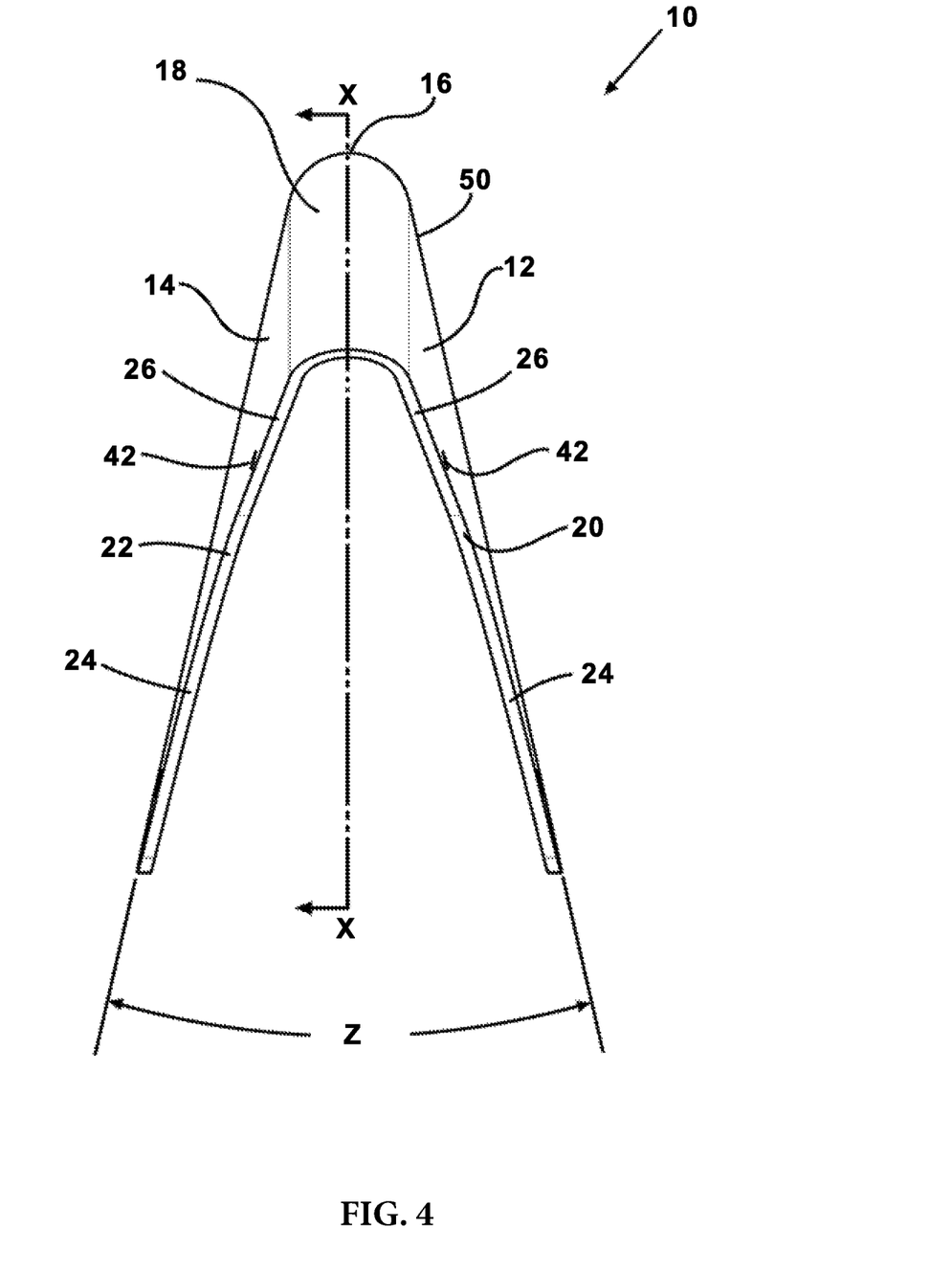
FIG. 4 is a front view of the unmounted bird nest deterrent shown in FIG. 1.

As shown in FIG. 4, the angle Z of the first angled planar side 12 from the second angled planar side 14 measured at the outer surfaces of first bottom edge 20 and second bottom edge 22 respectively may range from 10-60 degrees. The first bottom edge 20 and second bottom edge 22 are constructed to not be wider than the standard downspout corner fitting 30 at any given point.

Apertures such as first hole set 40 and second hole set 42 pass through the first angled planar side 12 and second angled planar side 14 in close proximity to the first bottom edge 20 and second bottom edge 22. One or more fasteners are utilized to operatively connect avian nesting deterrent 10 to one or more of a portion of the downspout and structure, such as a home or building. In one embodiment, the fastener is a first pull tie 44 that passes through the first hole set 40 in the first angled side 12 and second angled side 14. The first pull tie 44 encircles the standard downspout corner fitting 30 near the structure 38 and is joined at the tie connection 45, securing the bird nest deterrent 10 to the standard downspout corner fitting 30. A second pull tie 46 passes through the second hole set 42 in the first angled planar 12 and second angled planar side 14. The second pull tie 46 encircles the standard downspout straight section 32 then is joined at the tie connection 45, securing the bird nest deterrent 10 to the standard downspout straight section 32. When secured in position, the back edge 50 of the bird nest deterrent 10 preferably remains in a vertical position flush with the structure 38.

Figure 6:
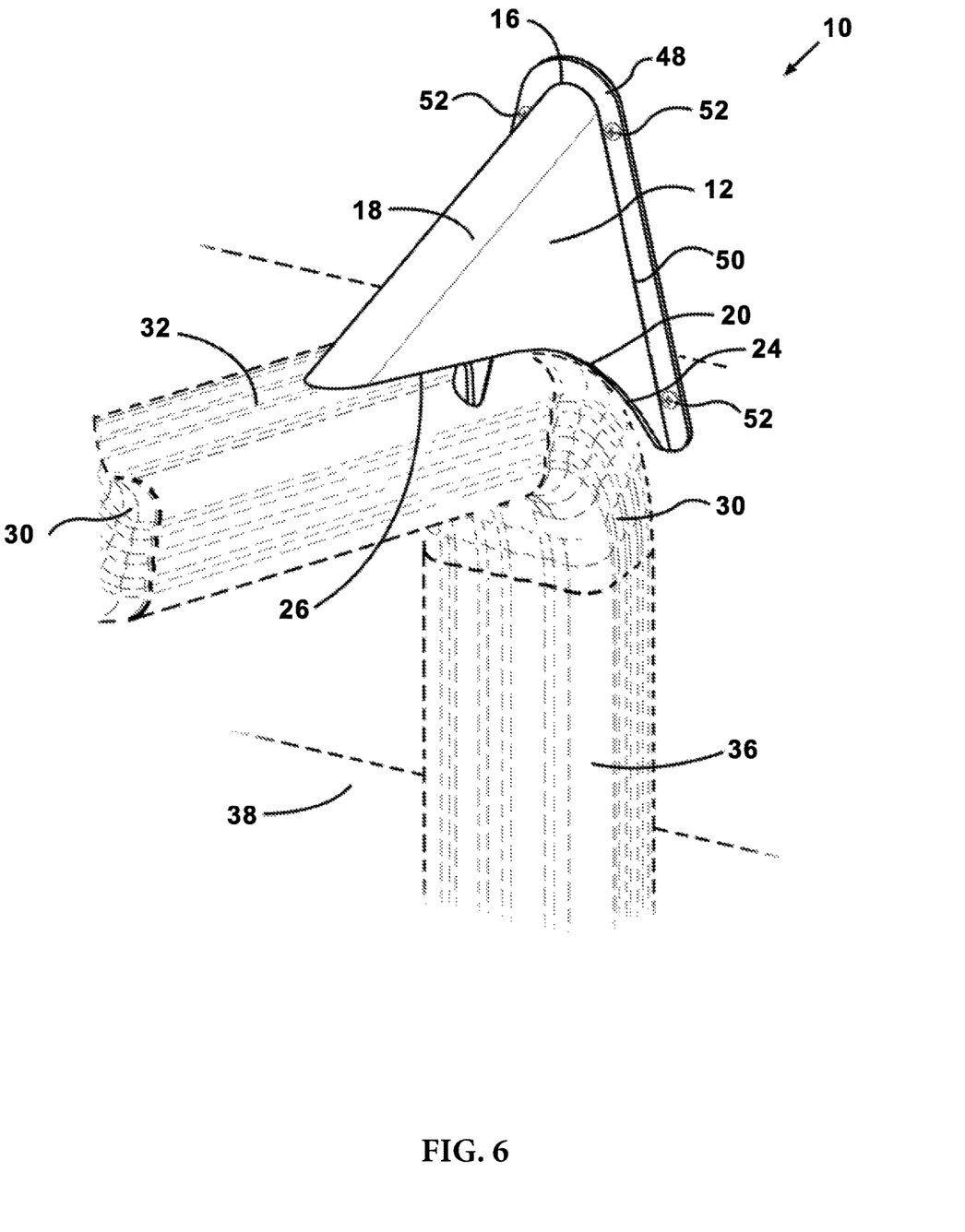
FIG. 6 is top perspective view of an alternate embodiment of a bird nest deterrent according to the present invention.

FIG. 6 refers to an alternate embodiment for securing the bird nest deterrent 10, wherein back edge 50 is provided with an outwardly extending flange 48. Flange 48 includes one or more apertures that accept a fastener, such as screw 52. In the embodiment illustrated, the flange extends upwardly from first bottom edge 20 and around apex 16 and down to second bottom edge 22 along back edge 50. However, it is to be understood that flange 48 may have other configurations and thus not extend completely around the entire back edge 50. Flange 48 protrudes at 90 degrees to the bird nest deterrent 10 back edge 50 in a preferred embodiment. Screws 52 may be placed through apertures on the flange 48 to fasten the bird nest deterrent 10 to the structure 38, effectively suspending the bird nest deterrent in position over the standard downspout corner fitting 30 and standard downspout straight section 32. The flange 48 may also be secured to the structure 38 by other fasteners, such as but not limited to, double sided tape or adhesive for instance.

Figure 7:
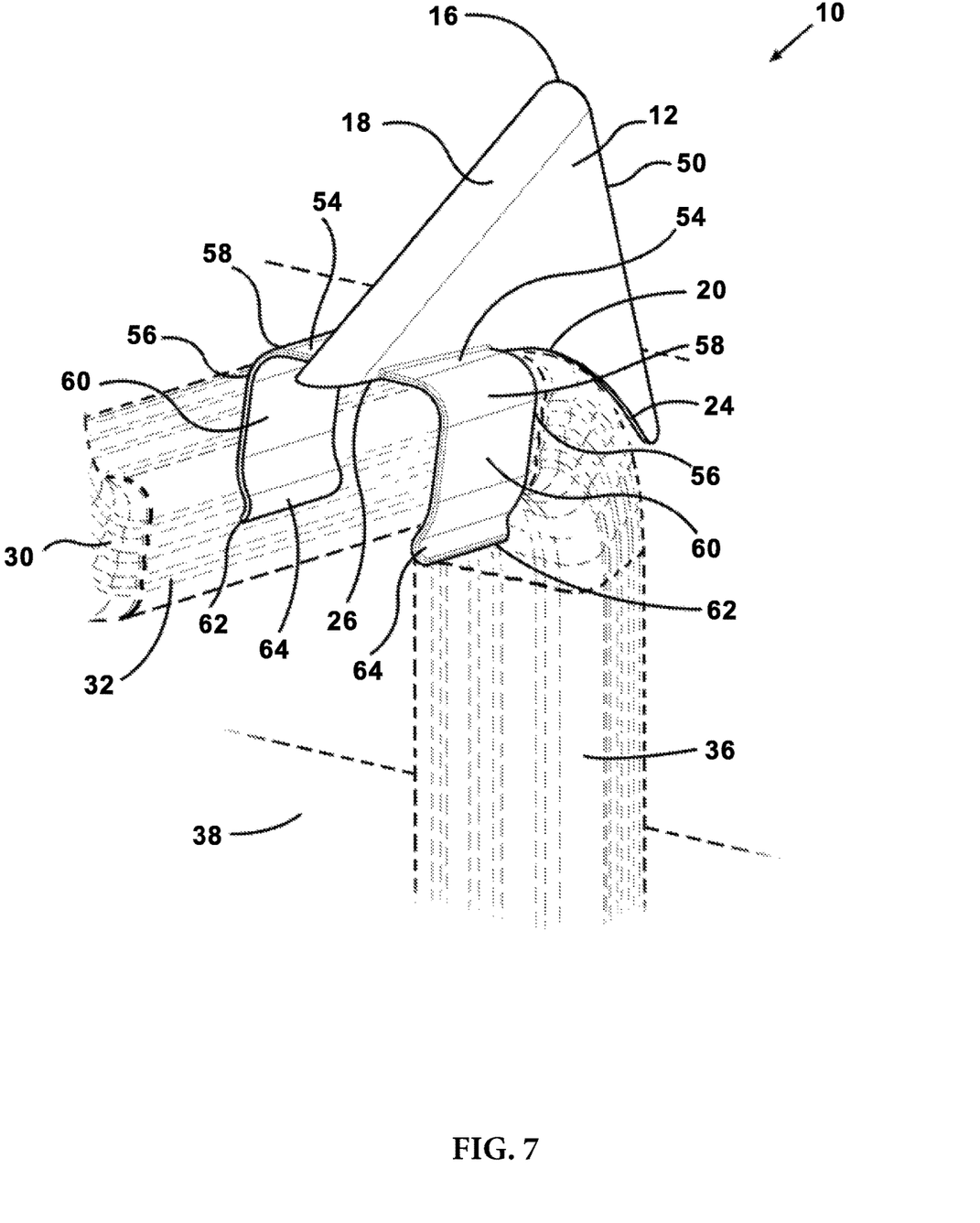
FIG. 7 is top perspective view of another alternate embodiment of a bird nest deterrent according to the present invention.

FIG. 7 refers to yet another alternate embodiment showing a clip body for securing the bird nest deterrent 10. Tab 54 is utilized as a fastener. A wide clip tab 54 protrudes outwards, preferably at 90 degrees from both straight portions 26 on the first bottom edge 20 and second bottom edge 22. A body portion 56 of the wide clip tab 54 protrusion consists of a curved portion 58, preferably a radius and a side 60 that are sized to envelop the outer profile and dimensions of the standard downspout straight section 32. A bottom return lip 62 that terminates the side 60 protrudes inward by means of a curved segment 64 and underneath the standard downspout straight section 32. The body portion 56 of the wide clip tab 54 is flexed outward when pushing the bird nest deterrent 10 downward over the top side of the standard downspout straight section 32. As the bird nest deterrent 10 is pushed over the standard downspout straight section 32 to a stop, the curved segment 64 of the bottom return lip 62 is biased back inward to rest under the standard downspout straight section 32. The curved segment 64 of the bottom return lip 62 maintains contact with the underside of the standard downspout straight section 32 to effectively hold the bird nest deterrent 10 firmly in position.

As shown in FIG. 3, when the bird nest deterrent 10 is mounted in position, the junction 39 created where the standard downspout corner fitting 30 meets the structure 38 becomes fully covered. Angle Y and angle Z, correspondingly shown in FIG. 3 and FIG. 4, work together towards angling the first planar 12 and second planar side 14 on a complex angle from each other, creating an apex 16 with a radius 18 that is non-conducive to avian perching. As the first planar side 12 and second planar side 14 are angled away from each other, the first bottom edge 20 and second bottom edge 22 gradually flare out away from center to preferably occupy the full width of the standard downspout corner fitting 30 at the junction 39, covering the junction 39 and eliminating access to crevices that serve as foundations for nest building.

The present invention has been described in detail with reference to the preferred embodiments. It is apparent that certain changes and modifications may be made without departing from the spirit and scope of the present invention. It is intended that all matter contained in the above description or shown in the accompanying drawings shall be interpreted as illustrative and not in a limited sense.

For the avoidance of doubt, it is to be understood that the nesting deterrent of the present invention can include one or more of each of the embodiments described herein. In some cases, it is desirable to provide a nesting deterrent with each of the embodiments presented herein and some other nesting deterrent comprise less than all of the embodiments described.

It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

What is claimed is:

1. An avian nesting deterrent for inhibiting a bird from building a nest where a downspout meets a structure, the avian nest deterrent comprising:
    a first planar side and a second planar side angularly joined at an apex;
    the first planar side and the second planar side having a first bottom edge and second bottom edge, respectively, each adapted to sit atop the downspout where the downspout meets the structure,
    wherein the first bottom edge and the second bottom edge meet at a junction with the apex,
    wherein the first bottom edge and the second bottom edge are profiled at an angle with respect to a longitudinal axis of the apex that ranges from 10-60 degrees measured at the junction of the apex and each of the first bottom edge and the second bottom edge;
    the first planar side and the second planar side each having a back edge adapted to abut against the structure;
    wherein the first bottom edge and the second bottom edge each have a straight portion and a curved portion with the straight portion being located further away from theft respective back edge of the deterrent and meeting at the junction with the apex, whereby the deterrent is adapted to fit at a junction where the downspout and the structure meet to eliminate a nesting location for birds.

2. The avian nesting deterrent of claim 1, wherein the first planar side is angled from the second planar side to form an angular cross section with the apex to position the first planar side and the second planar sides at compound angles.

3. The avian nesting deterrent of claim 2, wherein the apex consists of a radius.

4. The avian nesting deterrent of claim 1, wherein the back edge of each of the first planar side and second planar side is angled from 45 to 80 degrees with respect to the longitudinal axis of the apex.

5. The avian nesting deterrent of claim 1, wherein an overall width between the first bottom edge and the second bottom edge is between 51 and 102 mm.

6. The avian nesting deterrent of claim 1, wherein the to back edge of each of the first planar side and second planar side comprises a flange with apertures, wherein the flange extends outwardly from the first planar side and a second planar side.

7. The avian nesting deterrent according to claim 6, wherein the flange extends substantially perpendicular to the longitudinal axis of the apex.

8. The avian nesting deterrent according to claim 1, wherein a clip body is connected to the first bottom edge and the second bottom edge and adapted for securing the deterrent over a downspout.

9. The avian nesting deterrent according to claim 8, wherein the clip body comprises a tab that protrudes outwardly from both straight portions on the first bottom edge and the second bottom edge, wherein a side is connected to each tab and extends downwardly therefrom, and wherein a bottom lip is connected to each side and includes a portion that extends inwardly it is adapted to be positioned under a portion of the downspout.

10. The avian nesting deterrent according to claim 1, wherein apertures are present in the first planar side and the second planar side, and wherein a fastener extends through the aperture in the first planar side and the second planar side.

11. The avian nesting deterrent according to claim 1, wherein the fastener comprises a flexible tie.

12. A method for deterring a bird from nesting at the point where a downspout meets a structure, the method comprising:
    obtaining the avian nesting deterrent according to claim 1;
    mounting the avian nesting deterrent to the downspout, including securing the first bottom edge and the second bottom edge to a topside of a downspout;
    wherein a resultant compound face angle between the first planar side and second planar side occupies a corner where the downspout meets the structure and deters avian perching and nest building;
    wherein the apex formed at the junction of the first planar side and second planar side that angles upward towards the structure;
    wherein an angle of the apex from the structure in conjunction with a triangular cross section of the first planar side and the planar side eliminates conducive ledges and crevices for perching and nest building, respectively.

* * * * *

UNITED STATES PATENT AND TRADEMARK OFFICE
CERTIFICATE OF CORRECTION

PATENT NO. : 10,834,915 B1
APPLICATION NO. : 16/561437
DATED : November 17, 2020
INVENTOR(S) : Paul Tamulewicz It is certified that error appears in the above-identified patent and that said Letters Patent is hereby corrected as shown below:

In the Claims

Claim 1, Line 22, delete "theft" and replace with -- their --.

Claim 6, Line 1, delete "to".

Claim 12, Line 17, insert -- second -- after the word "the".

Claim 12, Line 17, delete "conducive".

Signed and Sealed this
Nineteenth Day of January, 2021

Andrei Iancu
*Director of the United States Patent and Trademark Office*